US 11,250,374 B2

(12) United States Patent
Mak et al.

(10) Patent No.: US 11,250,374 B2
(45) Date of Patent: Feb. 15, 2022

(54) LOCKER AND LOCKER SYSTEM

(71) Applicant: Hong Kong R&D Centre for Logistics and Supply Chain Management Enabling Technologies Limited, Pok Fu Lam (HK)

(72) Inventors: Chi Lun Mak, Pok Fu Lam (HK); Chi Wai Leung, Pok Fu Lam (HK); Chi Hung Tong, Pok Fu Lam (HK)

(73) Assignee: Hong Kong R&D Centre for Logistics and Supply Chain Management Enabling Technologies Limited, Pok Fu Lam (HK)

( * ) Notice: Subject to any disclaimer, the term of this patent is extended or adjusted under 35 U.S.C. 154(b) by 623 days.

(21) Appl. No.: 16/086,071

(22) PCT Filed: Mar. 18, 2016

(86) PCT No.: PCT/CN2016/076750
§ 371 (c)(1),
(2) Date: Sep. 18, 2018

(87) PCT Pub. No.: WO2017/156776
PCT Pub. Date: Sep. 21, 2017

(65) Prior Publication Data
US 2020/0293990 A1    Sep. 17, 2020

(51) Int. Cl.
*G06Q 10/08* (2012.01)
*A47G 29/14* (2006.01)
*G06K 7/10* (2006.01)

(52) U.S. Cl.
CPC ....... *G06Q 10/0836* (2013.01); *A47G 29/141* (2013.01); *G06K 7/10316* (2013.01); *G06K 7/10366* (2013.01); *A47G 2029/145* (2013.01); *A47G 2029/149* (2013.01)

(58) Field of Classification Search
CPC .......... G06K 7/10316; G06K 7/10366; A47G 29/141; A47G 2029/145; A47G 2029/149
See application file for complete search history.

(56) References Cited

U.S. PATENT DOCUMENTS

| | | | |
|---|---|---|---|
| 2012/0161944 A1* | 6/2012 | Chen | G06K 17/00 340/10.6 |
| 2012/0211397 A1* | 8/2012 | Kilian | G06K 7/10178 206/719 |
| 2015/0227764 A1* | 8/2015 | Hussain | G16H 10/60 340/10.5 |
| 2016/0232386 A1* | 8/2016 | Sehmer | H05K 1/181 |

FOREIGN PATENT DOCUMENTS

| | | |
|---|---|---|
| CN | 202995758 | 6/2013 |
| CN | 204833504 | 12/2015 |

\* cited by examiner

*Primary Examiner* — Nabil H Syed
(74) *Attorney, Agent, or Firm* — Renner, Kenner, Greive, Bobak, Taylor & Weber

(57) ABSTRACT

A locker for receiving and retaining one or more packages includes an enclosure, the enclosure defining a storage cavity, the storage cavity configured to receive and retain the one or more goods, a radio signal sensing assembly disposed on the enclosure for sensing radio signals, the radio signal sensing assembly disposed on the enclosure in an orientation such that the radio signal sensing assembly can detect the presence of radio signals within the storage cavity.

22 Claims, 7 Drawing Sheets

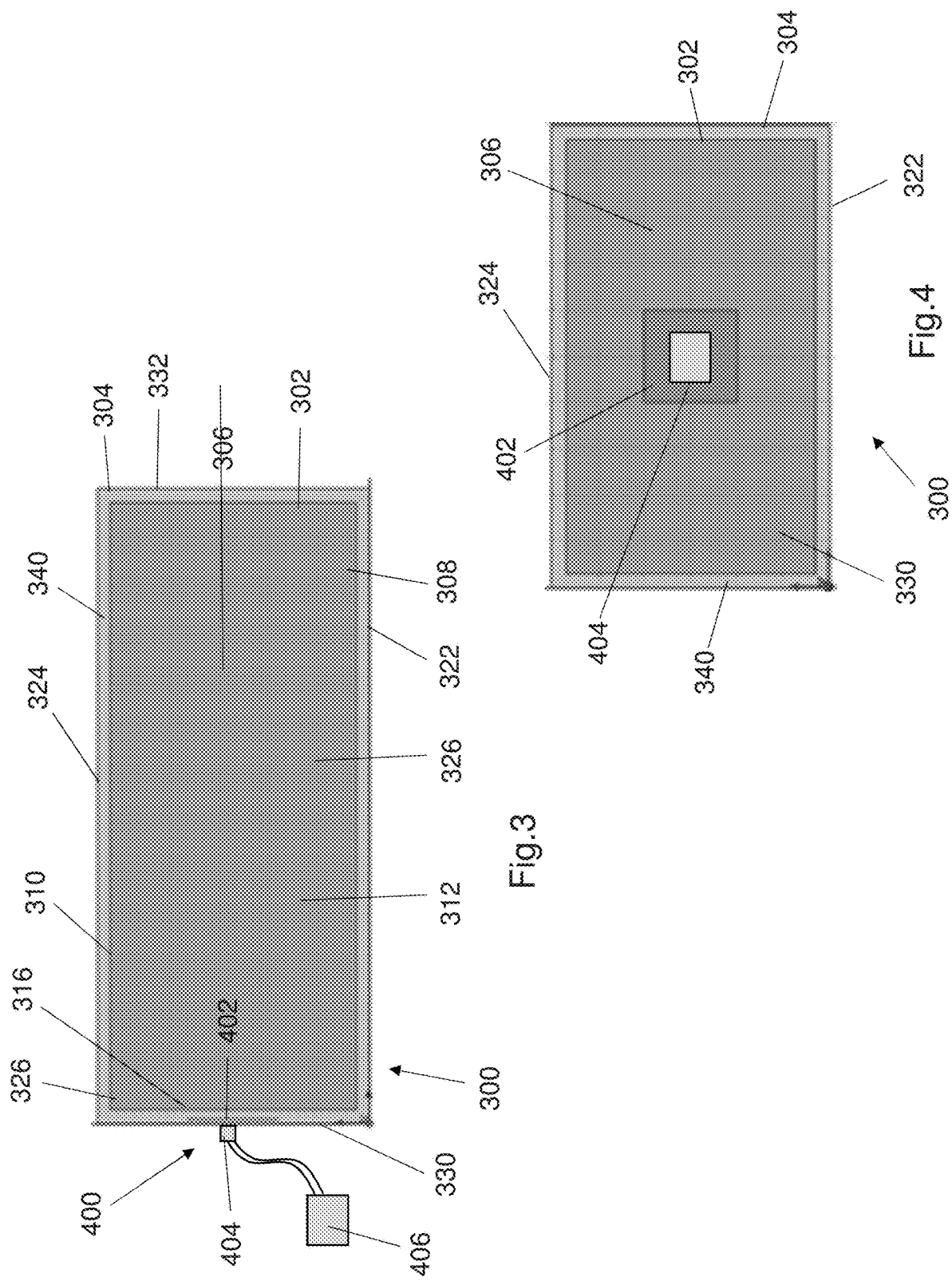

LOCKER AND LOCKER SYSTEM

TECHNICAL FIELD

The present invention relates to a locker and a locker system wherein the locker system includes at least a plurality of lockers arranged adjacent each other, and a locker management system for controlling the lockers thereof.

BACKGROUND

Online good and service purchase has become very popular with the rise of the internet. Online shopping sites such as EBay or Amazon or TradeMe are commonly used by consumers to purchase online goods. Further several merchants offer an online store to allow consumers to purchase goods directly from merchants from their online stores. These purchased online goods are delivered to the consumer that purchased the goods. There is a demand for a fast and accurate delivery service.

24/7 locker systems are commonly used as a delivery location instead of a personal address of the consumer, such as a home address or office address. 24/7 locker systems allow for secure delivery while allowing a consumer to maintain privacy of their personal addresses. 24/7 locker systems allow a merchant to deliver a purchased good at any time during the day and also allow a consumer to pick up a delivered good at any time during the day. There is a need for a good or parcel receiving and pick up systems.

Locker systems, such as the 24/7 locker systems contain a plurality of lockers that are arranged adjacent each other. Some examples of modern locker systems are the AusPost parcel lockers, or SingPost parcel lockers, NZ Post parcel lockers and Amazon locker systems. These locker systems are automated, electronic locker systems. Other locker systems that can be used are post boxes that are usually operated by postal companies such as NZ Post or AusPost. These post boxes are generally operated by human operators who receive deliveries of goods and place the goods into the appropriate post boxes. The cost of owning a post box can be quite high for consumers. These locker systems are used to receive and store goods or parcels.

SUMMARY OF THE INVENTION

In accordance with a first aspect the present disclosure relates to a locker for receiving and retaining one or more packages, the locker comprising:

an enclosure, the enclosure defining a storage cavity, the storage cavity configured to receive and retain the one or more goods, a radio signal sensing assembly disposed on the enclosure for sensing radio signals, the radio signal sensing assembly disposed on the enclosure in an orientation such that the radio signal sensing assembly can detect the presence of radio signals within the storage cavity.

In an embodiment the enclosure includes;

a base, a top, a pair of longitudinal upstanding walls arranged parallel to each other and extending between the base and the top;

a transverse upstanding wall extending upwardly from the base and arranged orthogonal to the longitudinal upstanding walls the base, the top, the longitudinal upstanding walls and the transverse upstanding wall defining the storage cavity.

In an embodiment the radio signal sensing assembly comprises;

a radio signal antenna, a radio signal reader in electronic communication with the radio signal antenna, a wall connector, the wall connector mounting the antenna onto one or the plurality of upstanding walls.

In an embodiment the radio signal antenna and wall connector being disposed on the transverse upstanding wall.

In an embodiment the centre of the radio signal antenna is aligned with the centre of the transverse upstanding wall, such that the antenna is positioned substantially in the centre of the transverse upstanding wall.

In an embodiment the radio signal antenna is a regular polygon in shape, and is substantially symmetrical about at least one axis of the antenna.

In an embodiment the antenna is square shaped having a length and width of 200 mm or less and a thickness of 10 mm or less; and wherein the antenna is a path antenna.

In an embodiment the radio signal antenna is an RFID antenna, the radio signal reader is an RFID reader that is in electronic communication with the RFID antenna, where in use the RFID antenna and the RFID reader are configured to detect the presence of a package within the storage cavity by detecting an RF signal from an RFID tag placed on the package.

In an embodiment the locker comprises an outer skin positioned around the enclosure, the outer skin substantially surrounding the enclosure.

In an embodiment the enclosure is formed from a plastics material, the outer skin is formed from a metal, the outer skin functioning as an RF shield to prevent leakage of RF signals from the storage cavity in use.

In an embodiment the RF shield is arranged to prevent RF interference from outside the enclosure.

In an embodiment the outer skin is a continuous skin with no gaps, or cracks, and wherein the outer skin completely surrounds the enclosure, the outer skin further comprises a door, the door pivotable between an open position and a closed position such that the storage cavity is accessible when the door is the open position.

In an embodiment the RF antenna is connected to the wall connector, the wall connector is removably coupled to the transverse wall of the enclosure by one or more fasteners.

In an embodiment the RF antenna is a circularly polarised antenna.

In an embodiment the radio signal sensing assembly includes a first RFID antenna and a second RFID antenna, the first RFID antenna and the second RFID antenna are arranged orthogonal to each other.

In accordance with a second aspect, the present disclosure relates to a locker for receiving and retaining one or more packages, the locker comprising:

an inner enclosure defining storage cavity for receiving and retaining one or more packages an outer enclosure, the inner enclosure being nested within the outer enclosure such that the outer enclosure substantially surrounds the inner enclosure.

In an embodiment, the inner enclosure is made of a non-metal material and is also arranged to ensure that no RF tag (pre-located on surface of parcel) is in very close proximity with metal, the outer skin.

This is advantageous in that the arrangement provides good communication between RF tag and RFID Antenna inside the locker.

In an embodiment the locker further comprises an intermediate layer, the intermediate layer disposed between the inner enclosure and the outer enclosure.

In an embodiment, the intermediate layer is space, the space being defined between the inner enclosure and the outer enclosure and wherein the space includes air.

In an embodiment, the space is arranged to be compose of a dielectric or air.

In an embodiment the space between the inner enclosure and the outer enclosure is between 5 mm and 20 mm.

In an embodiment the wall of outer enclosure is formed from a metal and the wall of inner enclosure is formed from a non-metal material such as plastics material, wood etc.

In an embodiment the outer enclosure comprises a base, a top, and a pair of longitudinal walls extending upwardly from the base toward the top, the longitudinal walls extending parallel to each other, a transverse wall extending from the base toward the top, the transverse wall being arranged orthogonal to the longitudinal walls, and a door hingedly attached to one of the longitudinal walls, the door hingable between a closed position and an open position, the door providing access to the inner enclosure and the storage cavity in the open position.

In an embodiment outer enclosure completely surrounds the inner enclosure, the outer enclosure being a sealed and unitary, such that there are no gaps or no cracks in the outer enclosure.

In an embodiment the locker comprises a patch antenna disposed on an inner surface of the outer enclosure, the patch antenna being disposed in the space between the outer enclosure and the inner enclosure, the patch antenna being structured to detect radio signals generated in the storage cavity within the inner enclosure.

In an embodiment the patch antenna is a generally square shaped antenna including a length of 160 mm or less, a width of 160 mm or less and a thickness of 10 mm of less.

In an embodiment the outer enclosure providing a radio frequency (RF) shield such that any radio signals from within the inner enclosure are not leaked from the inner enclosure, and preventing interference from ambient RF source outside the enclosure.

In an embodiment the thickness of the outer enclosure is at least 2 mm.

In an embodiment the antenna is connected to and in electrical communication with an RFID reader, the RFID reader adapted to detect the presence of a parcel through detecting the presence of an RFID tag attached to the parcel within the inner enclosure.

In accordance with a third aspect, the present disclosure relates to a locker system for receiving and storing one or more packages, each package of the one or more packages including an RFID tag, the locker system comprising;

a plurality of lockers arranged in an array, a plurality of RFID antennas, each RFID antenna of the plurality of antennas being disposed on each locker of the plurality of lockers, each RFID antenna detecting an RF signal from the RFID tag on the one or more packages, when the one or more packages is placed in the locker a locker system controller in electrical communication with the plurality of RFID antennas, the locker system controller receiving a signal from each RFID antenna, processing the received signal and identifying the locker that has the one or more package within it.

In an embodiment each locker of the plurality of lockers comprises an RF shielding arrangement, the RF shielding arrangement adapted to shield RF signals being emitted from each locker and to prevent interferences such that each RFID antenna does not generate a false-positive reading.

In an embodiment the RF shielding arrangement comprises a dual enclosure arrangement, the dual enclosure arrangement including an inner enclosure and an outer enclosure, wherein the outer enclosure functions as an RF shield.

In an embodiment each locker of the plurality of lockers includes an inner enclosure and an outer enclosure, the inner enclosure comprises a storage cavity adapted, in use, to receive and retain the one or more packages within it, and; wherein the outer enclosure completely surrounds the inner enclosure.

In an embodiment the outer enclosure comprises a pivotable door, the door being pivotable between an open position and a closed position, the inner enclosure and storage cavity being accessible when the door is in an open position, and the outer enclosure enclosing the inner enclosure and storage cavity when the door is in a closed position.

In an embodiment, the wall of outer enclosure is formed from a metal and the wall of inner enclosure is formed from a plastics material.

In an embodiment the locker system comprises an RFID reader, the RFID reader includes a plurality of antenna ports, wherein each RFID antenna is in electrical communication with the RFID reader, each RFID antenna is in electrical communication with a single antenna port of the plurality of antenna ports.

In an embodiment the locker system further comprises a communication link that is adapted, in use, to provide an electronic message to a user associated with the locker, when the presence of package is detected within the locker via the RFID antenna associated with the locker.

In an embodiment locker system further comprises a user interface arrangement, the user interface arrangement comprising at least a display unit, an input device and a speaker, the user interface arrangement allowing communication between the locker system controller and the user.

In an embodiment, the user interface is arranged to operate with a CCTV system, a Locker ID Beacon, including BLE Beacon, ibeacon), WiFi, RSSI or any one or more thereof.

In an embodiment each locker is similar to the locker as described any of the abovementioned aspects of the invention.

BRIEF DESCRIPTION OF THE DRAWINGS

Embodiments of a locker and locker system will now be described, by way of example, with reference to the accompanying drawings in which:

FIG. 3 shows a side view of a generalised locker, the locker being usable in the locker system.

FIG. 4 shows a rear view of the locker from FIG. 3.

DETAILED DESCRIPTION OF THE PREFERRED EMBODIMENT

Figure 1:
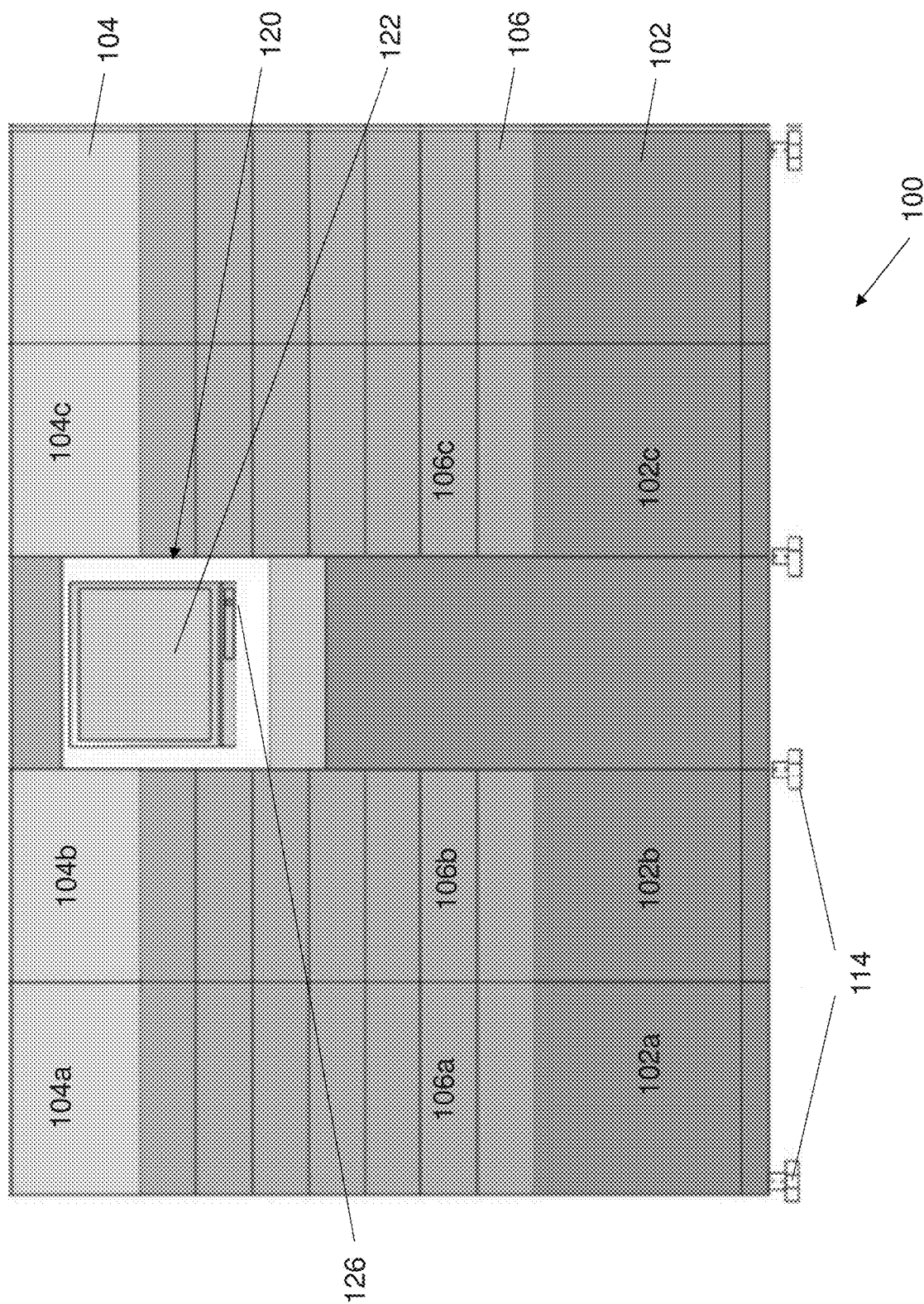
FIG. 1 shows an embodiment of a locker system that includes a plurality of lockers.

As described in the background locker systems are commonly used for package or parcel delivery and pick up. The use of automated locker systems is now widespread. Parcels or packages are placed in a designated locker by a delivery service such as DHL. The designated locker is a locker associated with a user and is specified to the delivery service as a delivery location.

RFID tags are commonly used in the parcel or package delivery industry. One application of RFID technology is used to track the location of a package. The RFID tag is placed on the package and the location of the package is tracked throughout the delivery route by scanning the RFID tag on the package. For example the package is scanned when it leaves its originating site, then scanned when received at any intermediate delivery sites and then scanned when received at the final delivery city or location. However there is generally no easy or automated manner for a user of a locker to know whether the package has arrived in their designated locker or locker system.

The present disclosure is directed to a locker system that comprises a plurality of lockers that are arranged adjacent to each other in an array. Each locker includes a storage cavity that can receive and retain one or more packages within the storage cavity. A user can own, rent or subscribe to one or more lockers in the locker system and use the locker/lockers to receive and retain a package, such as courier packages or online purchases. The present disclosure is also directed to a locker for receiving and retaining one or more packages. The terms locker and lockers are interchangeably used in the following description.

The present disclosure relates to a locker for receiving and retaining one or more packages, the locker comprising: an enclosure, the enclosure defining a storage cavity, the storage cavity configured to receive and retain the one or more goods, a radio signal sensing assembly disposed on the enclosure for sensing radio signals, the radio signal sensing assembly disposed on the enclosure in an orientation such that the radio signal sensing assembly can detect the presence of radio signals within the storage cavity. The enclosure includes; a base, a top, a pair of longitudinal upstanding walls arranged parallel to each other and extending between the base and the top; a transverse upstanding wall extending upwardly from the base and arranged orthogonal to the longitudinal upstanding walls and wherein the base, the top, the longitudinal upstanding walls and the transverse upstanding wall defining the storage cavity. The radio sensing assembly comprises; a radio signal antenna, a radio signal reader in electronic communication with the radio signal antenna, and a wall connector, the wall connector mounting the antenna onto one or the plurality of upstanding walls. The radio signal antenna is an RFID antenna that is arranged to detect the presence of a package within the storage cavity by detecting an RFID tag on the package. The RFID antenna is configured to scan the RFID tag on a package, if a package is received in the storage cavity.

The present disclosure further relates to a locker for receiving and retaining one or more packages, the locker comprising: an inner enclosure defining storage cavity for receiving and retaining one or more packages and an outer enclosure, the inner enclosure being nested within the outer enclosure such that the outer enclosure substantially surrounds the inner enclosure. The outer enclosure completely surrounds the inner enclosure, the outer enclosure being a sealed such that there are no gaps or cracks in the outer enclosure. The locker comprises a patch antenna disposed on an inner surface of the outer enclosure, the patch antenna being disposed in the space between the outer enclosure and the inner enclosure, the patch antenna being structured to detect radio signals generated in the storage cavity within the inner enclosure. The outer enclosure providing a radio frequency (RF) shield such that any radio signals from within the inner enclosure are not leaked from the inner enclosure and suppressing unwanted interference to neighbour lockers and false readings are avoided.

The present disclosure is also directed to relates to a locker system for receiving and storing one or more packages, each package of the one or more packages including an RFID tag, the locker system comprising; a plurality of lockers arranged in an array, a plurality of RFID antennas, each RFID antenna of the plurality of antennas being disposed on each locker of the plurality of lockers, each RFID antenna detecting an RF signal from the RFID tag on the one or more packages, when the one or more packages is placed in the locker; and a locker system controller in electrical communication with the plurality of RFID antennas, the locker system controller receiving a signal from each RFID antenna, processing the received signal and identifying the locker that has the one or more package within it. Each locker of the plurality of lockers comprises an RF shielding arrangement, the RF shielding arrangement adapted to shield RF signals being emitted from each locker such that each RFID antenna does generate a false-positive reading. The RF shielding arrangement comprises a dual enclosure arrangement, the dual enclosure arrangement including an inner enclosure and an outer enclosure, wherein the outer enclosure functions as an RF shield to prevent the RFID antenna of one locker generating a false positive reading of a package.

FIG. 1 shows an exemplary embodiment of a locker system 100 for receiving and storing one or more packages. FIG. 1 shows a front view of a locker system 100. The packages received and retained by the locker system 100 include an RFID tag positioned on the package. The locker system 100 comprises a plurality of lockers 102, 104, 106 arranged in an array. The lockers 102, 104, 106 are arranged adjacent each other. Only three lockers are labeled for clarity and ease of reference purposes. The locker system 100 can comprise a plurality of lockers. The illustrated embodiment the locker system 100 comprises a total of 38 lockers. In other embodiments the locker system can include any suitable number of lockers.

In the illustrated embodiment of FIG. 1, the locker system 100, includes three sizes of lockers. The three sizes of lockers are represented in FIG. 1 in three different shades. The large lockers denoted by the dark shade, the medium sized lockers are denoted by the lightest shade and the small sized lockers are denoted by the medium shade. Three large sized lockers are labeled 102a, 102b, and 102c. Three medium sized lockers are labeled 104a, 104b, and 104c. Three small sized lockers are labeled 106a, 106b, and 106c in FIG. 1. In the illustrated embodiment of FIG. 1, each large locker has a width of 570 mm, depth of 850 mm and a height of 470 mm. In the illustrated embodiment of FIG. 1, each medium locker has a width of 570 mm, depth 850 mm and a height of 250 mm. In the illustrated embodiment of FIG. 1, each small locker has a width of 570 mm, depth of 850 mm and a height of 140 mm.

Figure 2:
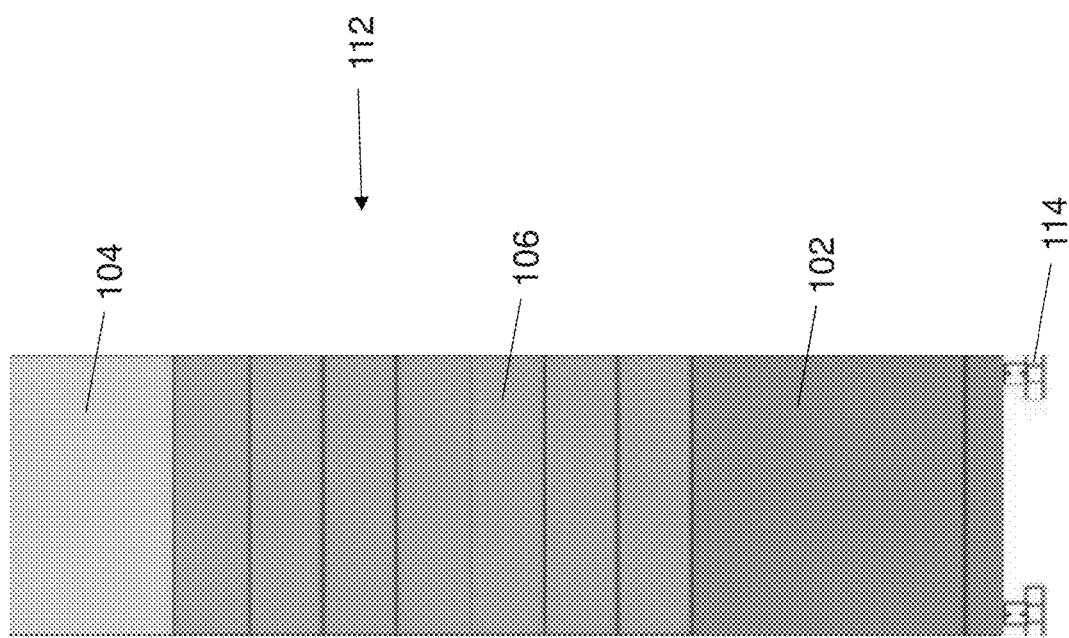
FIG. 2 shows an embodiment of a locker column module that may be part of a locker system, the locker column module includes a plurality of different sized lockers stacked on top of each other in a column arrangement.

The lockers 102, 104, 106 are arranged in an array 110. The locker system 100 comprises a plurality of separate locker column modules 112 that are positioned adjacent each other. FIG. 2 shows an exemplary embodiment of a locker column module 112. In the embodiment shown in FIG. 2, the locker column module 112 includes one large sized locker at the bottom, with seven small sized lockers stacked vertically, and one medium sized locker stacked at the top. The different sized lockers are represented by the similar tonal colour scheme as shown in FIG. 1.

Referring back to FIG. 1, the locker system 100 includes a user interface arrangement 120. The user interface arrangement 120 comprises a display unit 122, an input device 124 and a speaker 126. The user interface arrangement 120 allowing communication between the locker system 100 and a user. The user interface arrangement 120 allows interaction between a locker system 100 and a user. The display unit 122 is a screen such as an LED screen or an OLED screen. The screen also functions as an input device 124, since the screen is a touch screen. Alternatively the input device 124 can be a keyboard or a series of buttons. The speaker 126 allows for voice communication between the locker system 100 and a user. The input device 124 may further include a scanner (not illustrated). The scanner can be used by a user to scan an access card such as an octopus card or any other access card. The access card includes information associated with one or more lockers that are used by the user. In some examples, the user interface arrangement 120 may operate with CCTV systems, internet or intranet connections, 3G.4G cellular connections, SMS communications, iBeacon, BLE beacon, positioning systems and locker identification systems.

The locker system 100 is positioned on a plurality of feet 114. As shown in FIG. 2, each locker column module 112 includes a pair of feet 114 that are spaced apart from each other. The feet 114 support the locker system 100 and each locker column module 112 in a spaced orientation relative to the ground.

Figure 5:
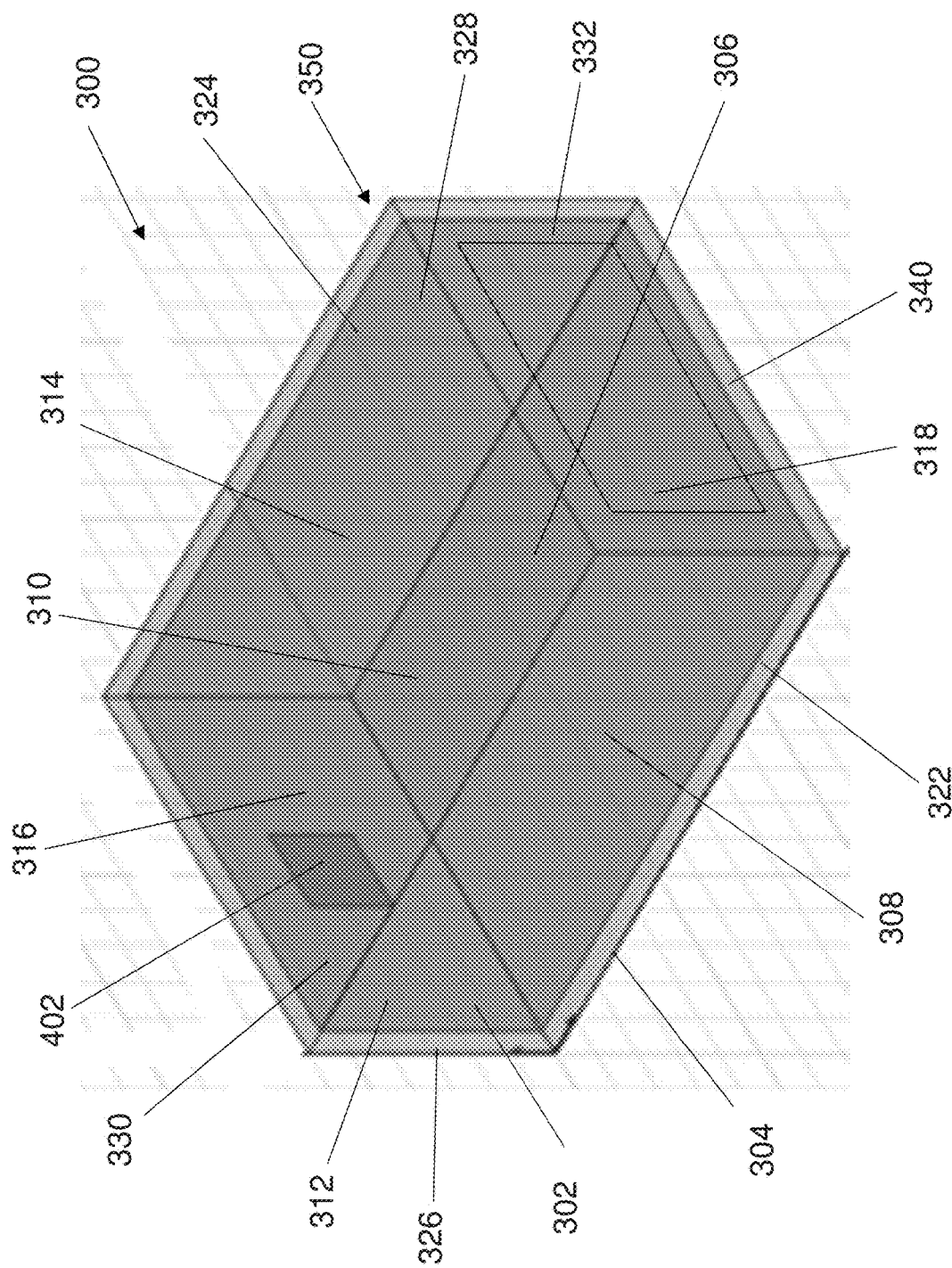
FIG. 5 shows a perspective view of the locker of FIG. 3.

As described the locker system 100 comprises a plurality of lockers. An exemplary locker 300 will be described with respect to FIGS. 3 to 5. FIGS. 3 to 5 show details of a locker that can be used as part of the locker system 100. The locker 300 described with respect to FIGS. 3 to 5 can be modified to be any suitable dimension, and any shapes and geometry including a regular-shaped box, or boxes of other irregular shapes e.g. cylinder, pyramid, cone, or even sphere, etc. depending on the configuration of the locker system. As described the exemplary locker system includes three different sized lockers 102, 104, 106. These lockers are shaped and structured like the locker 300 in the foregoing disclosure.

FIG. 3 shows a side view of a locker 300. FIG. 4 shows a rear view of the locker 300 and FIG. 5 shows a perspective view of the locker or locker 300. The locker 300 includes at least an inner enclosure 302 with a shielding arrangement 350. The locker 300 comprises a shielding arrangement 350. The shielding arrangement is adapted to shield RF signals being emitted from the locker, in particular from the storage cavity 306. The shielding arrangement 350 comprises the outer enclosure 304.

The locker 300 includes an inner enclosure 302 and an outer enclosure 304. The shielding arrangement 350 comprises an inner enclosure 302 and an outer enclosure 304. The inner enclosure 302 defines a storage cavity 306 that retains a package. The inner enclosure 302 and outer enclosure 304 are of identical shape. In the illustrated embodiment as per FIG. 5, the inner enclosure 302 and the outer enclosure 304 are rectangle in shape. The inner enclosure 302 is nested within the outer enclosure 304. The inner enclosure 302 and the outer enclosure 304 are arranged co-axial to each other along a common longitudinal axis. In the illustrated configuration the inner enclosure 302 is arranged substantially in the centre of the outer enclosure 304.

The inner enclosure 302 includes an inner enclosure base 308 and an inner enclosure top 310 arranged opposed to each other. The inner enclosure 302 further includes a plurality of upstanding walls extending upwardly from the inner enclosure base 308. As shown in FIG. 5 the inner enclosure 302 includes a pair of longitudinal walls 312, 314. The inner enclosure longitudinal walls 312, 314 are arranged parallel to each other along the base 308. The inner enclosure longitudinal walls 312, 314 extend upwardly from the base 308 toward to the top 310, and extend between the base 308 and top 310. The inner enclosure further includes an inner enclosure transverse wall 316. The transverse wall 316 extends between the longitudinal walls 312, 314. The transverse wall 316 is arranged orthogonal to the inner enclosure longitudinal walls 312, 314. The inner enclosure transverse wall 316 of the inner enclosure 302 is positioned at the rear of the enclosure, the transverse wall 316 defining a rear wall. A front portion of the inner enclosure includes an opening 318 that provides access to the storage cavity 306. The opening 318 at the front portion of the inner enclosure 302 is shown in FIG. 5. The storage cavity 306 is defined by the inner enclosure base 308, inner enclosure top 310, inner enclosure longitudinal walls 312, 314 and the inner enclosure transverse wall 316.

The outer enclosure 304 includes an outer enclosure base 322 and an outer enclosure top 324. The outer enclosure top 324 is opposed to the outer enclosure base 322. The outer enclosure further includes a plurality of upstanding walls extending between the outer enclosure base 322 and the outer enclosure top 324. As shown in FIG. 5 the outer enclosure includes a pair of outer enclosure longitudinal walls 326, 328. The outer enclosure longitudinal walls 326, 328 extend parallel to each other in a longitudinal direction. The walls outer enclosure longitudinal walls 326, 328 are arranged such that they extend parallel to the inner enclosure longitudinal walls 312, 314. The outer enclosure longitudinal walls 326, 328 are taller i.e. have a greater height than the inner enclosure longitudinal walls 312, 314.

The outer enclosure 304 also includes an outer enclosure transverse wall 330. The outer enclosure transverse wall 330 is arranged orthogonal to the outer enclosure longitudinal walls 326, 328. The outer enclosure transverse wall 330 is arranged to extend between the outer enclosure longitudinal walls 326, 328 and also extends upwardly from the outer enclosure base 322 to the outer enclosure top 324. The outer enclosure transverse wall 330 defines a rear wall of the outer enclosure. The outer enclosure 304 comprises a door 332. The door is hingedly or pivotably attached to the outer enclosure 304. The door 332 is pivotable between an open and a closed position. The storage cavity 306 is accessible when the door 332 is in the open position.

The locker 300 further comprises an intermediate layer 340. The intermediate layer 340 is positioned in between the inner enclosure 302 and the outer enclosure 304. The intermediate layer 340 may function as a spacer between the inner enclosure 302 and the outer enclosure 304. The intermediate layer 340 is bounded between the inner enclosure 302 and the outer enclosure 304. In the illustrated embodiment the intermediate layer 340 is a space defined between the inner enclosure 302 and the outer enclosure 304. In the illustrated embodiment the intermediate layer 340, i.e. the space includes air. Alternatively the intermediate layer 340 is comprised of a plastics material or any other suitable dielectric material such as foam, or a combination of air and plastics material.

The intermediate layer 340 is at least 10 mm wide. Alternatively the intermediate layer 340 may be wider than 10 mm. In the illustrated embodiment the intermediate layer 340 is 12.7 mm or 0.5 inches wide. In alternative embodiments the intermediate layer is a maximum of 40 mm wide. Any other width or thickness of intermediate layer is also possible. The thickness or width of the intermediate layer 340 is dependent on the size of the overall locker. The intermediate layer 340 comprises a thickness or width is suitable to promote an increased read rate and also provide shielding of RF signals. In one configuration the locker 300 comprises a plurality of plastic posts (not illustrated) that extend between the outer enclosure 304 and the inner enclosure 302, through the intermediate layer 340. The posts support the inner enclosure 302 within the outer enclosure 304. The posts are substantially thin and pass through the space that is intermediate layer 340 in the illustrated embodiment.

The outer enclosure 304 completely surrounds the inner enclosure 302. The outer surface of the outer enclosure is a planar surface with no gaps, hence the inner enclosure 302 is completely enveloped or encircled by the outer enclosure 304. The outer enclosure 304 is structured such that there are gaps or openings in the outer enclosure 304 when the door 332 is the closed position. The outer enclosure 304 and the intermediate layer 340 provide shielding of RF signals such that RF signals generated by an RFID tag within the storage cavity 306 do not leak out of the locker 300. The outer enclosure 302 is shaped and structured to provide improved RF shielding. The door 332 is shaped such that there no slit shaped apertures formed when the door 332 is in a closed position. Any apertures or openings in the outer enclosure will cause leakage of RF signals. Therefore the door is 332 comprises a large continuous sheet of material, that is formed from the same material as the outer enclosure 304. The door 332 is designed such the edges are planar and level to minimize the occurrence of unwanted apertures or slits in the door or at the interface between the door and the inner enclosure 302 and the door and the outer enclosure 304.

The outer enclosure 304 is formed from a metal. Preferably the outer enclosure 304 is formed from a metal that provides radio frequency (RF) shielding. The outer enclosure 304 is structured and formed from a metal that blocks RF signals being leaked from the storage cavity 306 and out of the outer enclosure 304, and also blocking RF signals being interfered from the outside of 304. In one example the outer enclosure 304 is formed from aluminium, copper or steel. The outer enclosure 304 being formed from a metal provides stiffness and mechanical rigidity to the outer enclosure 304. The outer enclosure 304 is formed from a suitable manufacturing process such as casting, rolling or any other suitable process.

The outer enclosure 304 is thick enough to provide RF shielding. The thickness of the outer enclosure walls and door is at least 2 mm. Alternatively the thickness of the outer enclosure 304 can be greater than 2 mm. In one embodiment the outer enclosure 304 is less than 40 mm in thickness. The thickness of the outer enclosure 304 is such that the outer enclosure 304 provides substantial RF shielding, while reducing the total weight of the locker. The locker 300 (and therefore the lockers of the locker system 100), is designed such that the volume of the storage cavity 306 is maximized.

The inner enclosure 302 is formed from a plastics material. In one example the inner enclosure 302 is formed from polycarbonate or polyethene. Preferably the inner enclosure 302 is formed from a rigid plastics material that provides mechanical rigidity and maintains structural integrity. The inner enclosure 302 being formed from a plastics material also makes the inner enclosure 302 light weight. The inner enclosure 302 is formed from any suitable manufacturing process such as moulding or extrusion or any other suitable process.

The inner enclosure 302 occupies a substantial amount of the outer enclosure volume. The inner enclosure 302 occupies between 20% and 60% of the total outer enclosure volume. In the illustrated embodiments the inner enclosure 302 occupies approximately 45% of the total volume of the outer enclosure 304. The volume of the inner enclosure 302 can vary depending on the size of the overall locker 300. The inner enclosure 302 occupying less than 60% of the outer enclosure 304 volume is advantageous because the outer enclosure 304 is sufficiently large enough to provide RF shielding.

The locker 300 further comprises a radio sensing assembly 400. The radio sensing assembly 400 is disposed on an enclosure. The radio sensing assembly 400 is disposed on one of the inner enclosure 302 or outer enclosure 304. The radio sensing assembly 400 is disposed on either the inner enclosure 302 or outer enclosure 304 in an orientation such that the radio sensing assembly 400 can detect the presence of radio signals within the storage cavity 306. The radio sensing assembly 400 is configured to detect the presence of a package within the storage cavity by detecting an RFID tag that is on the package.

The radio sensing assembly 400 further comprises a radio signal antenna 402, a radio signal reader 406 in electronic communication with the radio signal antenna 402 and a wall connector 404, wherein the wall connector 404 mounting the antenna 402 onto one of the plurality of upstanding walls of one of the inner enclosure 302 or the outer enclosure 304. The radio signal antenna 402 and the wall connector 404 are disposed on a transverse upstanding wall. The wall connector 404 is configured to mount the antenna 402 in a manner such that the centre of the radio signal antenna 402 is aligned with the centre of a transverse upstanding wall, such that antenna 402 is positioned substantially in the centre of the transverse upstanding wall.

In the illustrated embodiment of FIGS. 3 to 5, the radio signal antenna 402 and the wall connector 404 are disposed on the outer enclosure 304. In particular the radio signal antenna 402 and the wall connector 404 are disposed on the outer enclosure transverse wall 330. At least the radio signal antenna 402 is positioned such that the antenna extends into the intermediate layer i.e. into the space between the inner enclosure 302 and the outer enclosure 304, as shown in FIG. 5. The radio signal antenna 402 is mounted on an inner surface of the outer enclosure transverse wall 330. The wall connector 404 is mounted either within the outer enclosure transverse wall 330 or on an outer surface of the outer enclosure transverse wall 330. The wall connector 404 connects the antenna 402 to the outer enclosure transverse wall 330. In one embodiment the radio signal antenna 402 is mounted such that the antenna is flush with the inner surface of the outer enclosure transverse wall 330.

The antenna 402 is mounted in the rear of the locker so that the antenna does not impinge or occupy any area within the storage cavity. Further the antenna 402 being positioned in the rear i.e. on the rear wall (the transverse wall), provides the antenna the widest operational field for detecting the presence of a package within the storage cavity 306. The RFID antenna 402 being mounted in the rear of the locker 300 ensures minimal interference for the antenna within the line of sight (i.e. sensing pathway) of the antenna 402.

The radio signal antenna 402 is an RFID antenna. The RFID antenna 402 is configured to interact with an RFID tag on a package placed in the storage cavity 306. The RFID antenna 402 interacts with the RFID tag on the package to detect the presence of the package in the storage cavity 306. The RFID antenna 402 is a circularly polarized antenna. The RFID antenna 402 is structured and constructed for a high read rate. The circularly polarized structure of the RFID antenna 402 provides an antenna with an increased read rate. Alternatively the RFID antenna 402 may be a coil antenna or any other suitable antenna.

Figure 7:
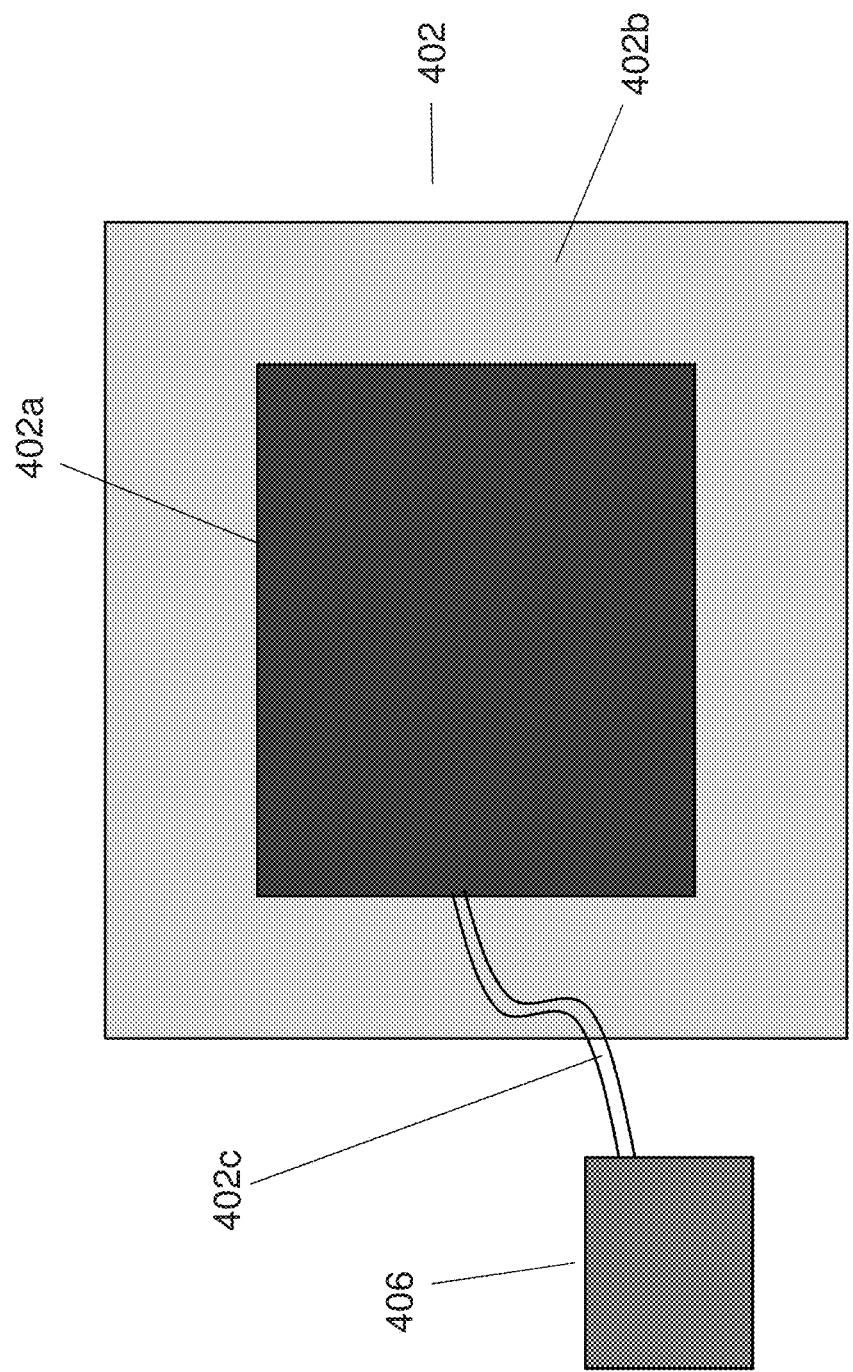
FIG. 7 shows an embodiment of an RFID antenna that is used on each locker of the locker system.

In one embodiment the RFID antenna 402 is a patch antenna. FIG. 7 shows an exemplary embodiment of the patch antenna that is used as the RFID antenna 402. The RFID antenna 402 is square in shape. The RFID antenna 402 is a low profile antenna and is substantially flat. The RFID antenna 402 comprises a flat square sheet of metal 402a mounted on a larger sheet of metal 402b. The first sheet 402a is a top layer and the second sheet 402b is a bottom layer. The antenna 402 is formed as a laminate structure. The substrate 402b is a larger sheet of metal that functions as a ground plane. The antenna 402 includes a micro strip feed line or a coaxial probe feed from the ground plane, that is the substrate is a dielectric layer between 402a and 402b and which is supporting the top layer 402a. The micro strip feed line or coaxial probe feed can be connected directly to reader or alternatively can be connected to a flexible wire that is connected to the reader. FIG. 7 shows a flexible electrical lead 402c connects the antenna 402 to the RFID reader 406. The antenna 402 is in electrical communication with a reader.

Alternatively the substrate may be an insulating dielectric such as a printed circuit board. The first sheet of metal 402a functions as the antenna. The sheet 402a may be etched into the substrate and is rectangle or square in shape or any other shapes. In the illustrated embodiment the RFID antenna 402 is square in shape. The RFID antenna 402 in the illustrated embodiment comprises a length of 160 mm, a width of 160 mm and a thickness of 2 mm. Alternatively the RFID antenna 402 has a length of less than 160 mm, a width of less than 160 mm and a thickness of between 10 mm and 2 mm. In further alternative embodiments the RFID antenna 402 may rectangle or hexagonal or any other shape. In a further configuration the RFID antenna 402 may include a upper layer (not shown) that functions as a superstrate or protective cover preventing the antenna from being damaged, and is formed from a dielectric material.

The size of the RFID antenna 402 can be varied depending on the dimensions of the locker, and in particular depending on the dimensions of the outer enclosure transverse wall 330. The RFID antenna 402 is sized such that the RFID antenna 402 occupies between 5% and 25% of the area of the outer enclosure transverse wall 330. The antenna 402 being sized to occupy at least 5% of the total area of the outer enclosure transverse wall 330 (i.e. the rear wall) ensures the antenna 402 is of a minimum size to detect and transmit signals from an RFID tag located within the storage cavity. More preferably the area of the RFID antenna 402 occupies between 10% and 18% of the total area of the outer enclosure transverse wall 330. In alternative embodiments the RFID antenna 402 is sized to occupy between 5% and 25% of the total area of the inner enclosure transverse wall.

The RFID antenna 402 is configured to interrogate an RFID tag on a parcel or package when the parcel or package is placed in the storage cavity 306 of the locker 300. The antenna 402 can be any antenna suitable for detecting the presence of RFID tags. The RFID tag on the package or parcel may be an active or passive RFID tag. The RFID antenna 402 has a read rate that is sufficiently has enough to detect when a package or parcel is placed in the locker 300. The RFID antenna 402 can be any suitable antenna to read any suitable RFID tag used on a package. Preferably passive RFID tags are used since they are cheaper and easier to maintain.

The wall connector 404 is a polygon shaped plate that is used to mount the RFID antenna 402 on a wall of either the inner enclosure 302 or outer enclosure. In the illustrated embodiment the wall connector 404 mounts the RFID antenna on the outer enclosure transverse wall 330. As per the illustrated embodiment the wall connector 404 is a rectangle shaped plate. The wall connector 404 attaches to the outer surface of the outer enclosure transverse wall 330, and acts as a support structure to support the RFID antenna 402. The RFID antenna can be adhered to the wall connector or may be fastened with a fastener such as a bolt, screw or clip assembly.

The RFID antenna 402 is in electronic communication with an RFID reader 406. The RFID reader 406 is an electronic module that is configured to process electrical signals from the RFID antenna 404. The RFID reader 406 functions as an interrogator and interrogates the RFID tags on any packages in the locker 300. The RFID reader 406 receives signals from the antenna 402 after the reader 406 interrogates the RFID tag. The RFID reader 406 includes a processor to processor signals from the antenna and determine the presence of a package by detecting whether an RFID tag is present in the storage cavity 306. The RFID reader 406 includes suitable electronic circuitry to process signals from the RFID antenna 402.

Figure 6:
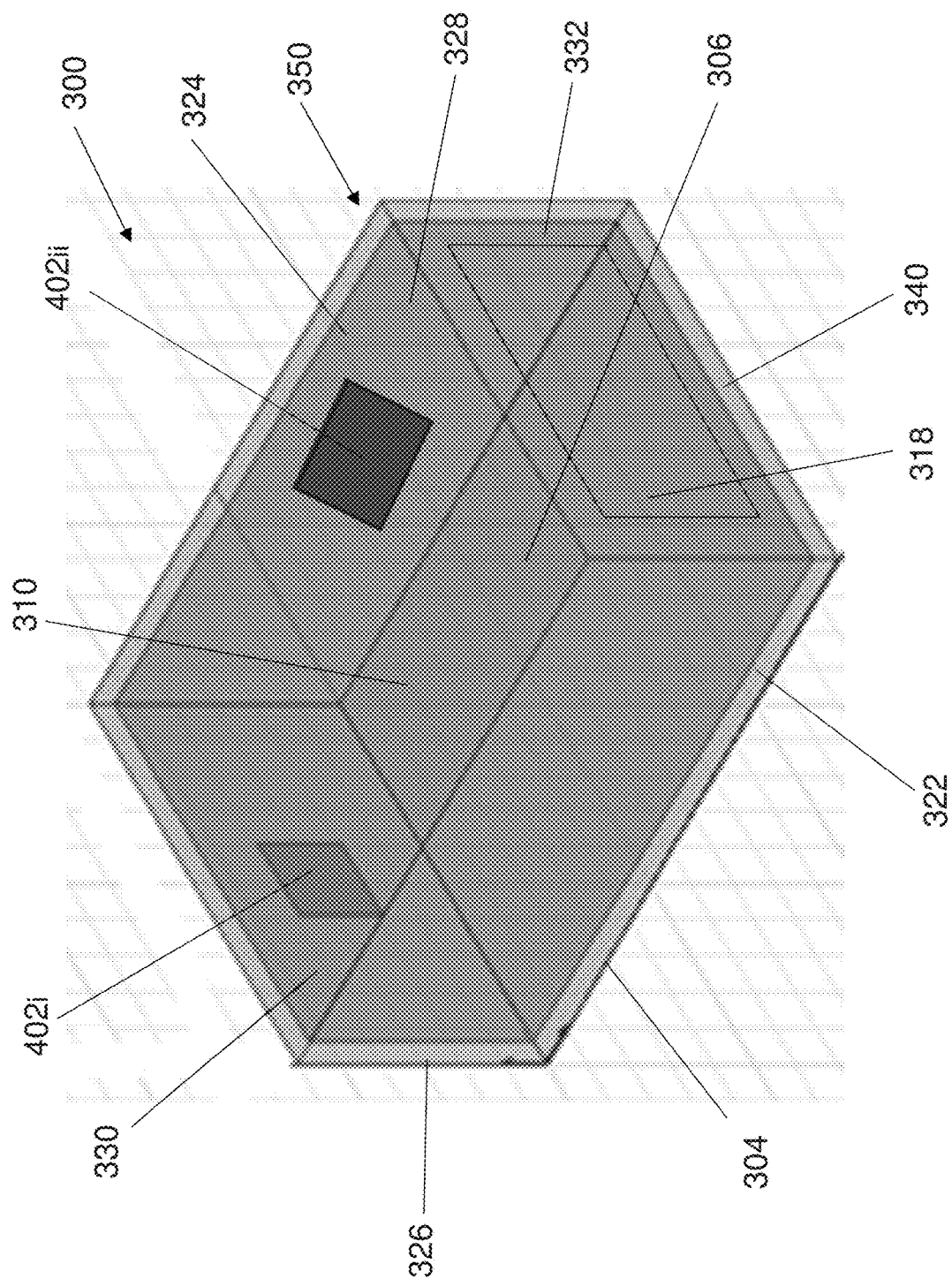
FIG. 6 shows an alternative embodiment of a locker that includes a pair of RFID antennas disposed on one or more of the upstanding walls of the locker.

In an alternative embodiment the locker 300 may comprise two antennas 402 that are arranged at an angle to each other. FIG. 6 shows this alternative embodiment. Preferably the antennas are arranged orthogonal to each other. In this alternative embodiment the locker may comprise a first RFID antenna $402_i$ and a second RFID antenna $402_{ii}$. The first RFID antenna $402_i$ is disposed on the outer enclosure transverse wall 330 and the second RFID antenna $402_{ii}$ is disposed on one of the outer enclosure longitudinal walls 326, 328. The first RFID antenna $402_i$ and second RFID antenna $402_{ii}$ are arranged orthogonal to each other. The use of two RFID antennas can improve the accuracy in detecting the presence of an RFID tag. The use of two RFID antennas is also advantageous because it provides for a faster read rate for the sensing assembly 400.

Referring again to FIG. 1, the locker system 100 comprises a plurality of lockers 102, 104 and 106 arranged in an array. The system 100 comprises at least one RFID antenna 116 disposed on a locker wherein each RFID antenna 116 detecting an RF signal from an RFID tag on one or more packages, when the one or more packages is placed in the locker. The RFID antenna 116 is the same in structure and construction as RFID antenna 402. In the foregoing disclosure the RFID antenna 116 should be understood to be a patch antenna that is circularly polarized and is substantially square in shape, similar to RFID antenna 402.

The lockers 102, 104, 106 of the locker system 100 are the same as the locker 300. The locker system 100 includes a plurality of locker 300 arranged adjacent each other in an array. Each locker 102, 104, 106 of the locker system 100 comprises a dual enclosure arrangement, as described with respect to FIGS. 3 to 5. The dual enclosure arrangement as described is advantageous because the outer enclosure 304 provides a substantial amount of RF shielding. The outer enclosure of each locker is formed of a metal such as copper, aluminium or steel. The outer enclosure is at least 2 mm thick, and provides a shielding of at least 100 dB or greater at the operable frequency range. The outer enclosure 304 completely surrounds or encloses the inner enclosure of each locker when the door is closed to maximize RF shielding. The outer enclosure provides adequate shielding such that the adjacent antennas do not receive a false positive reading. For example when a package with an RFID tag is received in a first locker, the RFID antennas of lockers adjacent the first locker do not also detect the presence of the package in the first locker because of the shielding arrangement that shields RF signals being emitted from the first locker to adjacent locker antennas, i.e. the outer enclosure of the first locker that provides RF shielding to prevent false positive readings from the antennas of the adjacent lockers.

Figure 8:
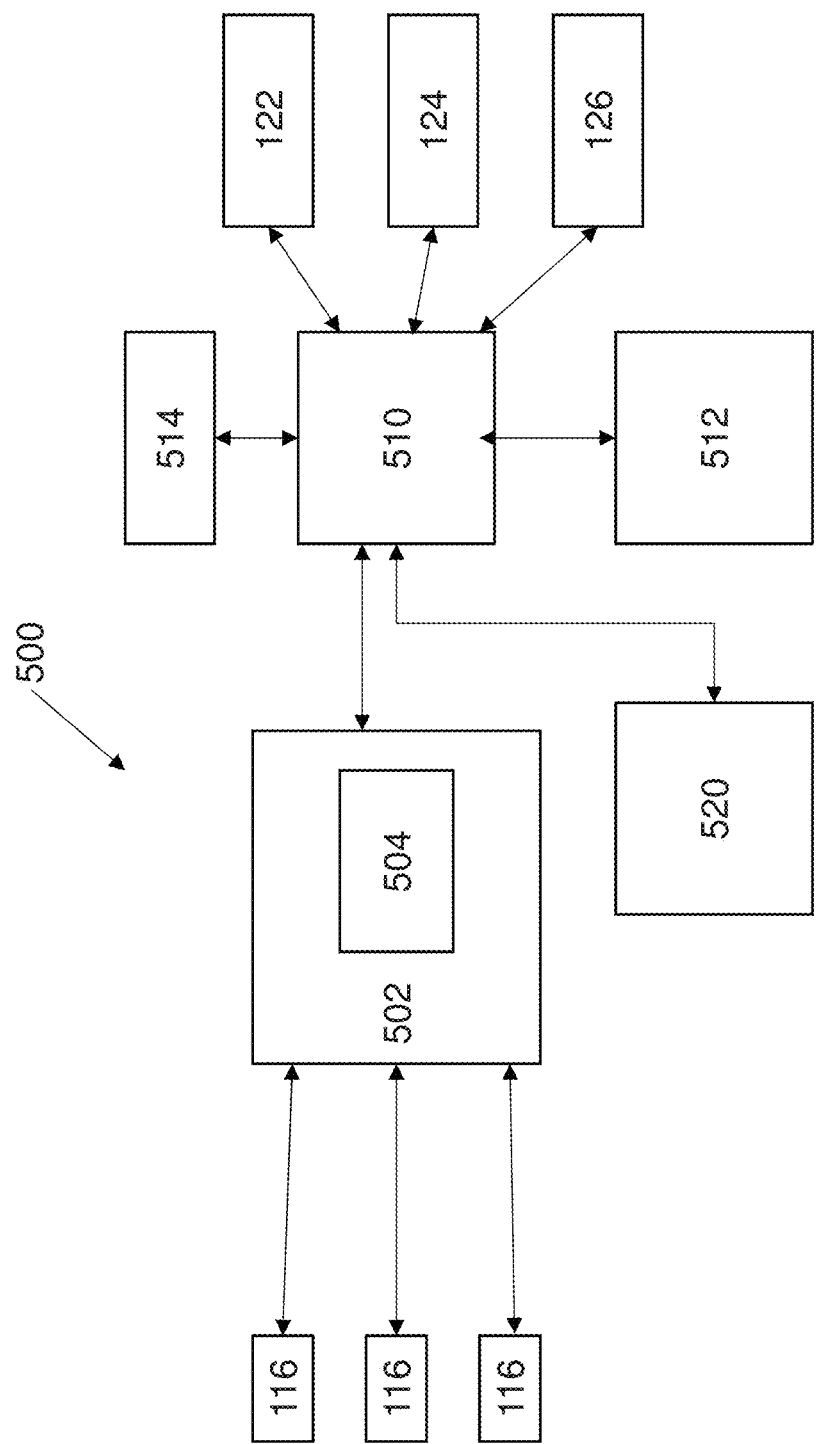
FIG. 8 shows a schematic view of a locker system controller and the components of the locker system controller.

FIG. 8 shows a schematic diagram a locker system controller 500 that is part of the locker system 100. The locker system controller 500 comprises a radio signal reader 502, a central processor 510, a communications link 512 and a lock controller 520.

The radio signal reader 502 is an electronic reader configured to read and process radio signals received from the antenna. In the illustrated embodiments of the locker system 100, the radio signal reader 502 is an RFID reader. The RFID reader 502 is in electrical communication with each RFID antenna that is included in the locker system 100. As described earlier each locker 102, 104, 106 includes an RFID antenna disposed on a wall of the locker, and preferably on a rear transverse wall of the locker.

The RFID reader 502 includes a plurality of input ports, each input port corresponding with each RFID antenna 116 (or 402). The RFID reader 502 includes a multiplexer circuit within it, to allow the RFID reader 502 to read and identify multiple signals from multiple RFID antennas 116 (or 402). The RFID reader 502 reads an input signal at regular time intervals, the time interval being set by the multiplexer circuit. The read time of each RFID reader 502 can be modified by a user. In one embodiment the RFID reader 502 comprises up to 32 input ports and can receive inputs from 32 RFID antennas. Alternatively the RFID reader 502 may include a switch or other time based controller that allows the RFID reader 502 to read multiple signals from multiple RFID antennas 116, 402.

The RFID reader 502 includes a RF signal processor 504 that is electronic communication with the input ports. The signals received from the RFID antennas 116 are processed by the RF signal processor 504. The RF signal processor 504 identifies the specific antenna 116 or antennas that detect the presence of a package with an RFID tag on the package. The RFID reader 116 can also be adapted to identify the locker or lockers 116 that do not have a package within it.

Some examples of an RFID reader 502 is a Speedway Reader antenna hub or GPIO adapter. The RFID reader 502 and its associated electronics is disposed in a casing, and the casing is attached to the back of one of the locker system 100.

In an alternative configuration the each locker module 112 may include an RFID reader 502 associated with the locker module, and the RFID reader 502 is connected to the antennas on each locker module 112. In a further alternative configuration RFID reader 502 may be implemented as a software module on a processor associated with the locker system controller 500. The RFID reader software module being implemented as machine readable code stored on a local memory unit and executable by a processor.

As described the locker system 100 comprises a user interface arrangement 120. The user interface arrangement 120 comprises a display unit 122, an input device 124 and a speaker 126. The locker system controller 500 further includes a central processor 510. The central processor 510 functions as an interface between the RFID reader 502 and the user interface arrangement 120.

The central processor 510 controls or interfaces with each of the elements of the user interface arrangement 120. The central processor 510 is in electronic communication with the RFID reader 502. The RFID reader 502 can transmit information relating to the locker or lockers that include a package to the central processor 510. The central processor 510 is arranged to display this information on the display unit 122 and/or also provide an audible signal to a user through the speaker. The locker system 100 may further comprise a central memory 514, in communication with the central processor 510. The central memory 514 is arranged to store various information related to the locker system 100. The locker system 100 further comprises an operating system being executed on the central processor 510.

The locker system controller 500 comprises a communication link 512, as shown in FIG. 8. The communication link 512 is a hardware component that allows the locker system 100 to transmit information via an appropriate wireless communication protocol such as Bluetooth or infrared. The communication link 512 further allows the locker system to connect to and transmit messages across current telecommunications protocols such as 4G or text messages. The operation of the communication link 512 is controlled by the central processor 510. The communication link 512 is adapted, in use, to provide an electronic message to a user associated with the locker, when the presence of package is detected within the locker via the RFID antenna associated with the locker. In one example the communication link provides a text message or an email to a user informing the user that a package has been received. The central processor 510 is adapted, in use to operate the communication link 512 when the central processor 510 receives a positive package detection from the RFID reader 502. The particular user or recipient is identified from the central memory 514. The central memory 514 stores a list of users associated with each locker. The list may be stored in the form of a database.

This is advantageous because the locker system 100 can automatically inform a user that a package has been received in the locker system. Such an automated message service makes use easier for a user, and reduces the need for the user to utilise a tracking number and constantly check the status of a package.

The locker system controller 500 may comprise a lock controller 520. In the illustrated embodiment the locker system includes a lock controller 520 that is in communication with the lock of each locker 102, 104, and 106. The locks of each locker may be an electronic lock that is electronically controllable. The locker controller 520 is in electronic communication with the central processor 510. Alternatively the lock controller 520 may be in direct electronic communication with the RFID reader 502.

The central processor 510 provides either an unlock or lock signal to the lock controller 520. For example when a user closes the locker and provides a lock instruction through the input device 124, e.g. a keyboard or button, the central processor 510 provides a lock signal to the lock controller 520. The lock controller 520 is arranged to lock the specified locker by activating the electronic lock. If the central processor receives an appropriate code, or other appropriate input that identifies the user associated with a locker, the central processor 510 transmits an unlock signal to the locker controller 520. The locker controller 520 is adapted to unlock the electronic lock of the identified locker such that the user can access the storage cavity of the identified locker.

The use of RFID antennas in the locker system, and on each locker is advantageous because it provides additional functionality to automated locker systems. In particular the use of RFID antennas allows automated detection and identification of a package being received in a specific locker at a specific time of the locker system. Further using an RFID antenna as part of the locker system leverages the current industry practice in the package delivery industry. The use of RFID antennas allows automated detection of a package being received in to a locker of the locker system. The locker system and locker as disclosed are also advantageous because a message can be provided to a user when the presence of a package is detected. This makes package delivery, receipt and collection more efficient. Further the locker system and locker as described comprising one or more RFID antennas are advantageous because the locker system can provide a message to a delivery person or delivery service confirmation that the package has been received in a locker by using the locker control system and the communications link. The locker system controller may further be configured to determine the specific locker that has received a package. A message can be provided to the owner of the locker or to a delivery service that a package has been received into a specific locker. This makes the whole delivery process more transparent.

It will be appreciated by persons skilled in the art that numerous variations and/or modifications may be made to the embodiments or configurations as shown in the specific embodiments without departing from the spirit or scope of the disclosure. The present embodiments are, therefore, to be considered in all respects as illustrative and not restrictive. It will alternatively be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It is to be understood that, if any prior art information is referred to herein, such reference does not constitute an admission that the information forms a part of the common general knowledge in the art, in Australia or any other country.

The term "comprising" (and its grammatical variations) as used herein are used in the inclusive sense of "having" or "including" and not in the sense of "consisting only of".

The invention claimed is:

1. A locker system for receiving and storing one or more packages, each package of the one or more packages including an RFID tag, the locker system comprising:
    a plurality of lockers arranged in an array;
    a plurality of RFID antennas, each RFID antenna of the plurality of antennas being disposed on each locker of the plurality of lockers, each RFID antenna detecting an RF signal from the RFID tag on the one or more packages, when the one or more packages is placed in the locker; and
    a locker system controller in electrical communication with the plurality of RFID antennas, the locker system controller receiving a signal from each RFID antenna, processing the received signal and identifying the locker that has the one or more package within it, wherein each locker of the plurality of lockers comprises an RF shielding arrangement adapted to shield RF signals being emitted from each locker such that each RFID antenna does not generate a false reading, each RF shielding arrangement includes:
    an inner enclosure, and
    an outer enclosure, wherein the outer enclosure completely surrounds the inner enclosure and functions as an RF shield, wherein the inner enclosure includes a storage cavity adapted, in use, to receive and retain the one or more packages within it, and wherein the outer enclosure comprises a pivotable door, the door being pivotable between an open position and a closed position, the inner enclosure and storage cavity being accessible when the door is in an open position, and the outer enclosure enclosing the inner enclosure and storage cavity when the door is in a closed position.

2. The locker system in accordance with claim 1, wherein the outer enclosure is formed from a metal and the inner enclosure is formed from a plastics material.

3. The locker system in accordance with claim 1, wherein the locker system comprises an RFID reader, the RFID reader includes a plurality of input ports, wherein each RFID antenna is in electrical communication with the RFID reader, each RFID antenna is in electrical communication with a single input port of the plurality of input ports.

4. The locker system in accordance with claim 1, wherein the locker system further comprises a communication link that is adapted, in use, to provide an electronic message to a user associated with the locker, when the presence of package is detected within the locker via the RFID antenna associated with the locker.

5. The locker system in accordance with claim 1, the locker system further comprises a user interface arrangement, the user interface arrangement comprising at least a display unit, an input device and a speaker, the user interface arrangement allowing communication between the locker system controller and the user.

6. The locker system in accordance with claim 1, wherein the inner enclosure includes;
    a base, a top,
    a pair of longitudinal upstanding walls arranged parallel to each other and extending between the base and the top;
    a transverse upstanding wall extending upwardly from the base and arranged orthogonal to the longitudinal upstanding walls;
    the base, the top, the longitudinal upstanding walls and the transverse upstanding wall defining the storage cavity.

7. The locker system in accordance with claim 6, wherein each of the plurality of lockers comprises a wall connector mounting the respective RFID antenna onto one of the plurality of upstanding walls.

8. The locker system in accordance with claim 7, wherein, in each of the plurality of lockers, the RFID antenna and the wall connector being disposed on the transverse upstanding wall.

9. The locker system in accordance with claim 8, wherein, in each of the plurality of lockers, the centre of the RFID antenna is aligned with the centre of the transverse upstanding wall, such that the RFID antenna is positioned substantially in the centre of the transverse upstanding wall.

10. The locker system in accordance with claim 1, wherein, in each of the plurality of lockers, the RFID antenna is a regular polygon in shape, and is substantially symmetrical about at least one axis of the RFID antenna.

11. The locker system in accordance with claim 1, wherein, in each of the plurality of lockers, the RFID antenna is square shaped having a length and width of 200 mm or less and a thickness of 10 mm or less.

12. The locker system in accordance with claim 1, wherein, in each of the plurality of lockers, the RFID antenna is a patch antenna.

13. The locker system in accordance with claim 12, wherein, in each of the plurality of lockers, the patch antenna being disposed in a space between the outer enclosure and the inner enclosure, the patch antenna being structured to detect radio signals generated in the storage cavity within the inner enclosure.

14. The locker system in accordance with claim 7, wherein, in each of the plurality of lockers, the RFID antenna is connected to the wall connector, the wall connector is removably coupled to the transverse wall of the enclosure by one or more fasteners.

15. The locker system in accordance with claim 7, wherein, in each of the plurality of lockers, the RFID antenna is a circularly polarised antenna.

16. The locker system in accordance with claim 1, wherein each of the plurality of lockers further comprises a second RFID antenna, and wherein in each of the plurality of lockers, the RFID antenna and the second RFID antenna are arranged orthogonal to each other.

17. The locker system in accordance with claim 1, wherein each of the plurality of lockers further comprises an intermediate layer, the intermediate layer disposed between the inner enclosure and the outer enclosure of each of the plurality of lockers.

18. The locker system in accordance with claim 17, wherein the intermediate layer is a space, the space being defined between the inner enclosure and the outer enclosure of each of the plurality of lockers and wherein the space includes air.

19. The locker system in accordance with 18, wherein the space between the inner enclosure and the outer enclosure is between 5 mm and 20 mm.

20. The locker system in accordance with claim 1, wherein, in each of the plurality of lockers, the outer enclosure being a sealed and unitary, such that there are no gaps in the outer enclosure.

21. The locker system in accordance with claim 1, wherein the outer enclosure is arranged to function as the RF shied such that any radio signals from within the inner enclosure are not leaked from the inner enclosure in each of the plurality of lockers.

22. The locker system in accordance with claim 1, wherein, in each of the plurality of lockers, the thickness of the outer enclosure is at least 2 mm.

* * * * *